SUBSCRIPTION TELEVISION SYSTEM

Filed March 23, 1959

4 Sheets-Sheet 1

INVENTORS
Bernard D. Loughlin
Erwin M. Roschke
BY Francis W. Crotty
ATTORNEY

INVENTORS
Bernard D. Loughlin
Erwin M. Roschke
BY Francis W. Crotty
ATTORNEY

March 12, 1963 B. D. LOUGHLIN ET AL 3,081,376

SUBSCRIPTION TELEVISION SYSTEM

Filed March 23, 1959 4 Sheets-Sheet 3

INVENTORS
Bernard D. Loughlin
Erwin M. Roschke
BY Francis W. Crotty
ATTORNEY

SUBSCRIPTION TELEVISION SYSTEM

Filed March 23, 1959 4 Sheets-Sheet 4

INVENTORS
Bernard D. Loughlin
Erwin M. Roschke
BY Francis W. Crotty
ATTORNEY 3,081,376

SUBSCRIPTION TELEVISION SYSTEM

Bernard D. Loughlin, Huntington, N.Y., and Erwin M. Roschke, Des Plaines, Ill., assignors to Zenith Radio Corporation, a corporation of Delaware Filed Mar. 23, 1959, Ser. No. 801,076
29 Claims. (Cl. 178—5.1)

The present invention is directed to an improved method of and system for accomplishing subscription television.

Various forms of subscription television systems have been proposed heretofore, all directed to the objective of making program material of superior quality available to those who subscribe to the service but unintelligible when translated in television receivers of non-subscribers. The end in view is accomplished by transmitting a television signal which is distinguished from a conventional television signal in that one or more of its characteristics has been so modified that the signal may be said to be scrambled or coded. A signal may be thus characterized when the response of a conventional television receiver to the reception of that signal results in the synthesizing of an unintelligible or greatly distorted image on the screen of the receiver. Of course, the method by which scrambling is achieved is made known to the subscribers to the system who are also provided with the necessary decoding gear which, when adjusted in accordance with the coding schedule of the particular program, compensates or unscrambles the broadcast as required to reproduce a high fidelity image on the viewing screen.

The subject invention, while directed to the same general goal, pertains to methods and systems of subscription television which are of materially less complexity than many systems previously proposed and which achieve a much superior destruction of video intelligence on the screen of the unauthorized or non-subscribing receiver.

Accordingly, a principal object of the invention is to provide an improved method and system of subscription television.

It is a particular object of the invention to provide a subscription television arrangement and method characterized by a more complete destruction of image intelligence resulting from unauthorized reception of the subscription telecast.

Subsidiary objects of the invention contemplate improved methods and arrangements for both transmitting and receiving subscription television programs.

In one of its broadest aspects, the invention contemplates an encoding method and arrangement for a subscription television system which features deriving a television signal having video information in recurring line-trace intervals and synchronizing components in recurring line-retrace intervals. An encoding signal component is also derived, characterized by a frequency corresponding approximately to the line frequency of the system, and this signal is introduced into the television signal at least during its trace intervals in phase opposition to the synchronizing components and of such amplitude as to modify the effectiveness of the synchronizing components.

As is true of most secrecy systems, the operative steps performed at the receiver in order to undo, unscramble or compensate for the coding introduced into the transmission are the same as operative steps adopted at the transmitter but employed in a complementary sense. Accordingly, the expression "encoding" is used generically to encompass transmitter as well as receiver embodiments of the inventive concept.

One especially desirable aspect of the transmitting end of the subject subscription system comprises means for developing a video signal representative of a televised scene and occurring during a succession of line-trace intervals separated by line-retrace intervals. There are additional means for developing a synchronizing signal including a component conveying timing information and occurring in the retrace intervals. Combining means, operatively associated with both of the aforementioned signal developing means, combine the video and synchronizing signals to develop a television signal for transmission to subscriber receivers. Further means are provided for introducing into that television signal, particularly during the trace intervals thereof, a coding signal component of such frequency and phase as to effect at least partial cancellation of the synchronizing components and, finally, there are means for effectively interrupting at least one of the synchronizing and coding components from time to time.

In a particular apparatus embodiment of such a transmitter, the normal or true synchronizing components are suppressed amplitude-wise to fall within the amplitude range normally set aside for video information and they are replaced in the transmitted signal by other components having the appearance of the usual synchronizing information but representing false timing data. The coding signal is a sinusoidal component locked to the line frequency and phased to present a peak essentially at the middle of the line-trace intervals, serving as a pedestal for the video components. Moreover, the false synchronizing signals are interrupted from time to time. Where the system employs negative modulation, in which decreasing carrier amplitude represents increasing brightness, the positive polarity peak of the coding signal is used as a video pedestal. In positive modulation systems, the negative peak of the coding signal is used for pedestalling video.

As will be explained more particularly hereinafter, this transmitter arrangement and method accomplish a highly perfected type of video scrambling or image destruction resulting from the fact that the coding signal has the effect of at least partially cancelling the synchronizing signal. In the face of this cancellation, the receiver tends to lock on modulation side band components spaced from the fundamental of the line-synchronizing component by multiples of the interruption frequency of the false synchronizing signals. This is referred to as a "side lock" condition which attains substantially complete destruction of the image intelligence when such a signal is translated by a conventional receiver.

One receiver embodiment of the invention features operating upon the received modulated television carrier in order to remove the scrambling and develop an essentially conventional television signal for application to the antenna terminals of a subscriber's receiver. The mechanism achieving this result is a decoder which includes a radio-frequency or carrier-frequency modulator to which the received signal is applied in its scrambled form. Correcting signals are also supplied to the modulator and include a decoding component of the same frequency but in phase opposition to the coding component of the received signal, a line-frequency pedestal and a counterphased synchronizing component. These correcting signals operating upon the carrier, in effect, remove the coding component which, if otherwise retained in the signal, cancels the effectiveness of the synchronizing component. Additionally, the false-synchronizing component is suppressed or deleted and, at the same time, the true synchronizing signal which has been transmitted suppressed, amplitude-wise, into the amplitude range conventionally devoted exclusively to video is pedestaled to achieve its normal position exceeding the amplitude range set aside for video. Such a receiver has the distinct advantage that these several correcting signals may be continuously and uninterruptedly supplied to the modulator and, the arrangement as described, minimizes the video flicker. Where the decoder is intended to feed into the antenna terminals of subscriber receivers, the modulator further receives a heterodyning signal which shifts the carrier frequency of the corrected signal to some channel assignment other than that upon which the scrambled signal has been received.

The foregoing and other objects of the invention, together with further advantages and benefits thereof, will be more clearly understood from the following description of particular embodiments thereof taken in conjunction with the annexed drawings in the several figures of which like components are designated by similar reference characters and in which:

FIGURE 1 is a block diagram of a subscription television transmitter constituting an apparatus embodiment of the present invention;

FIGURE 2 comprises a series of curves employed in explaining the operation of the subscription system;

Figure 6:
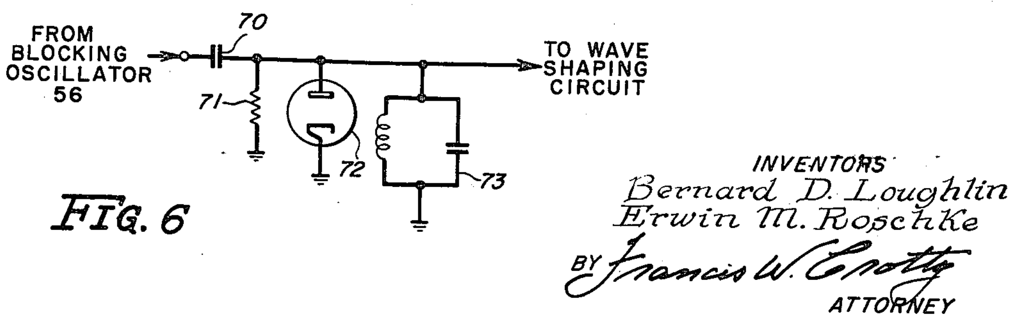
Figure 5:
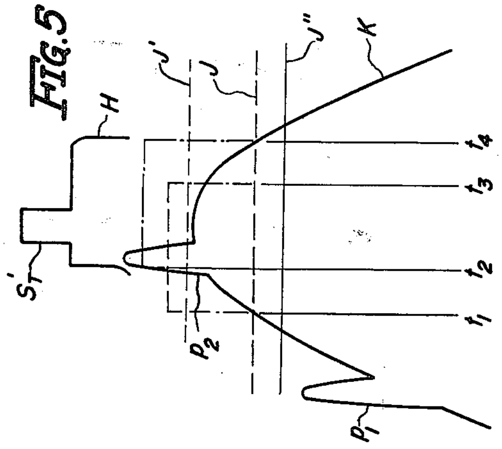
Figures 8, 9:
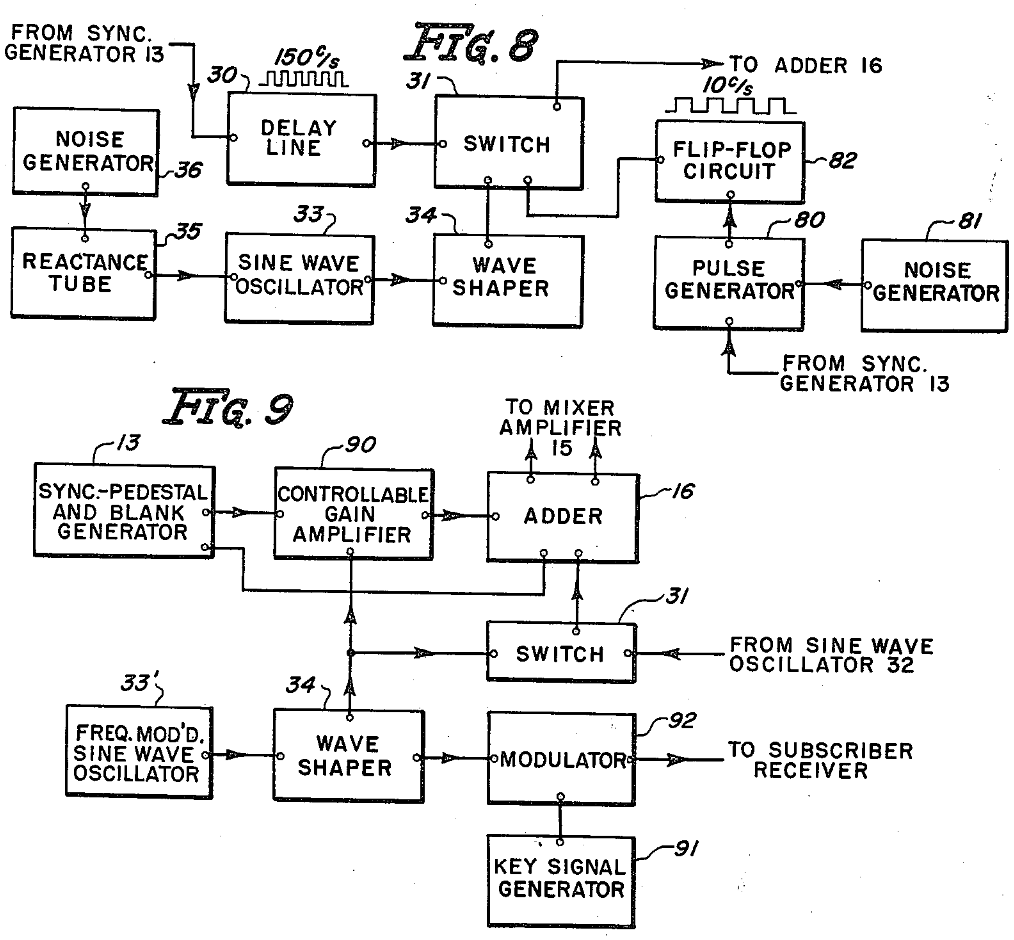
Figures 7, 10:
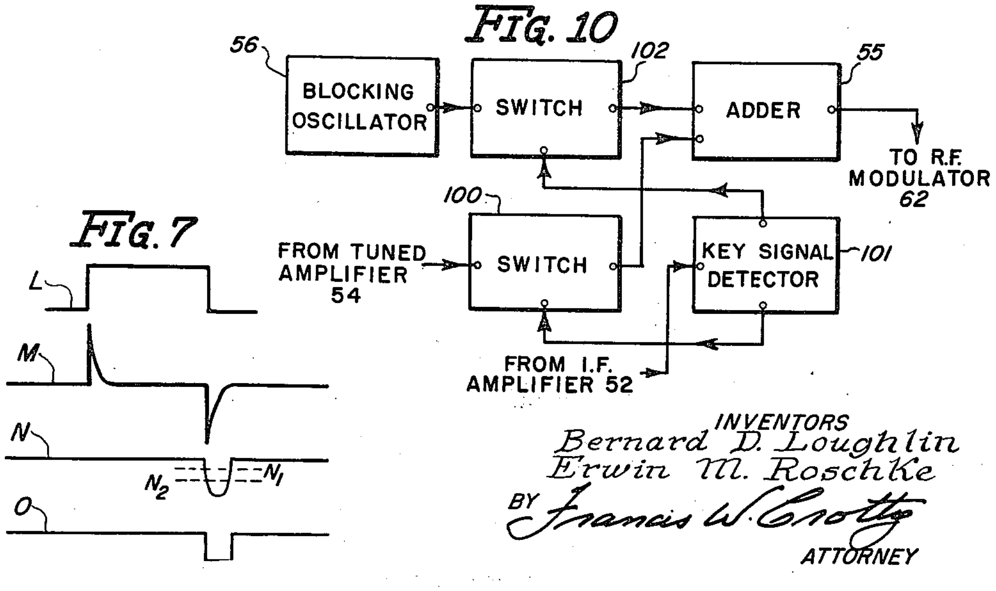

FIGURE 5 includes curves used in explaining the operation of the phase-control arrangement;

FIGURE 6 represents schematically an arrangement for developing a counterphase synchronizing signal in the decoder and the curves of FIGURE 7 are employed in explaining its operation;

FIGURES 8 and 9 represent different modifications of the transmitter end of the subscription system; and FIGURE 10 is a schematic representation of a modification of a decoder for subscriber receivers.

Figure 1:
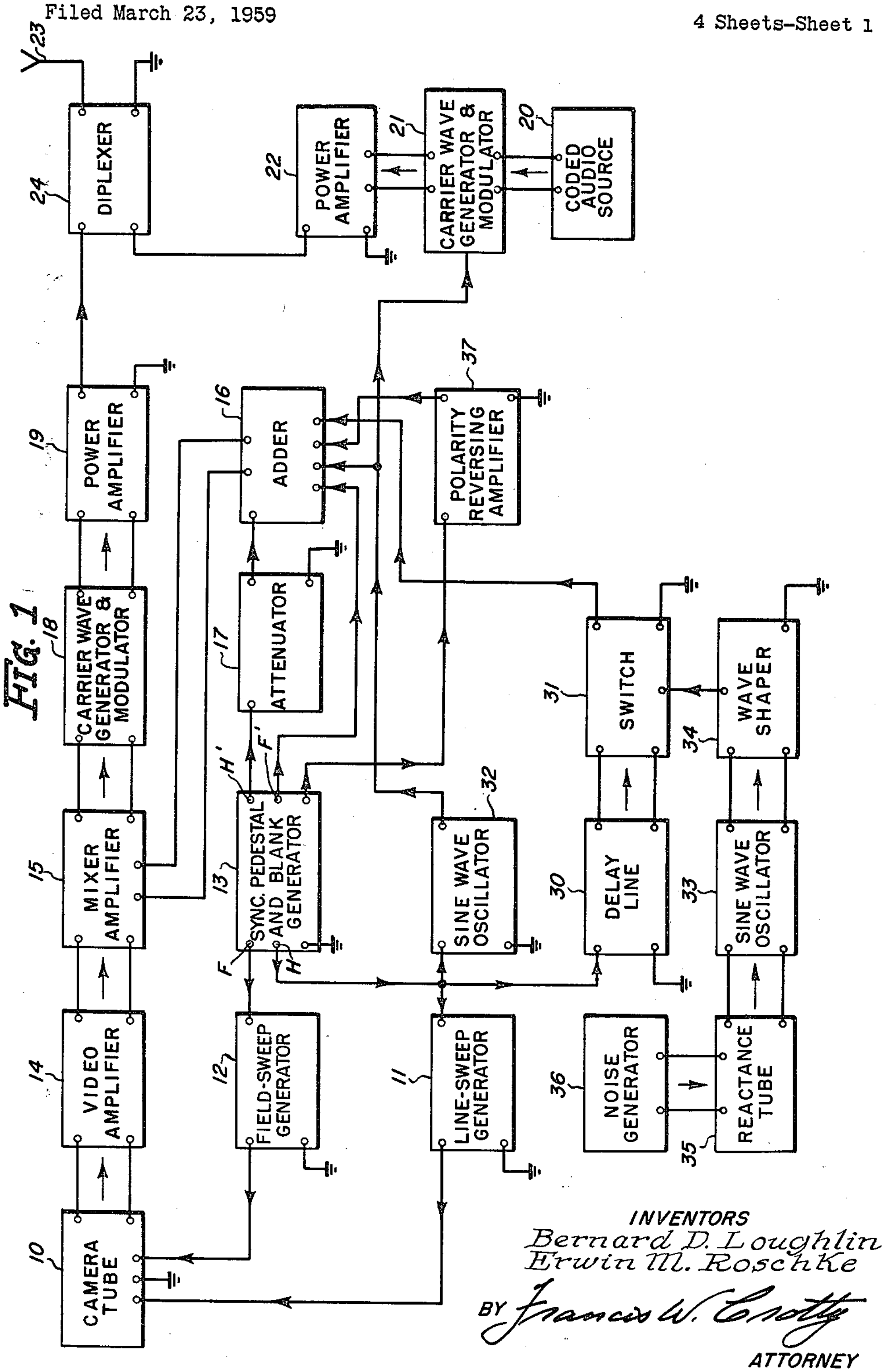

Referring now more particularly to FIGURE 1, the arrangement there represented is a television transmitter which, in general characteristics and makeup, is of conventional construction but differs from non-subscription transmitters in the inclusion of a coding arrangement employed to effect scrambling of the transmission as required of a subscription type of television transmitter. A camera tube 10 comprises means for developing a video signal representative of a televised scene. As is customary, the camera tube is associated with a deflection yoke to which scanning signals of line and field frequencies are supplied from line and field-sweep generators 11, 12. Timing or control circuits of these generators are coupled to appropriate output terminals of a generator 13 usually referred to as a synchronizing-signal generator and employed for the development of the requisite timing signals such as line and field-synchronizing and drive pulses, line and field-pedestal and blanking pulses as well. Field-synchronizing pulses are applied from terminal F to field generator 12 while horizontal-synchronizing pulses are delivered from terminal H to line-sweep generator 11.

A video-frequency amplifier 14 having any desired number of stages couples the output or load circuit of camera tube 10 to a mixer amplifier 15. This amplifier has additional input terminals coupled to synchronizing-signal generator 13 by way of an adder 16 and an attenuator 17. Units 16 and 17 are components of the coding mechanism and for the time being may be thought of as merely a connection through which the customary synchronizing, equalizing and pedestal components are delivered from generator 13 to mixer 15. The output circuit of this mixer is coupled to a modulating input circuit of a carrier-wave generator and modulator 18 having an output circuit connected to a power amplifier 19.

The aforementioned components, except for units 16 and 17, constitute the usual video section of a television transmitter and they have a companion audio section for transmitting the sound accompaniment of the video program. The audio section includes an audio signal source 20 which, during subscription program intervals, provides an audio signal of coded or scrambled form. No novelty is predicated herein in respect of audio coding so that this unit may be any of the well-known types of speech secrecy or scrambling arrangements. The output circuit of audio source 20 connects to the modulating input of another carrier-wave generator and modulator 21 having output terminals connected to a power amplifier 22. Power amplifiers 19 and 22 connect to an antenna system 23 through the usual diplexer 24.

If it is assumed that source 20 provides an uncoded audio signal, it will be recognized that the arrangement of FIGURE 1, as thus far described, is a conventional television transmitter. The details of construction and overall operation of such a transmitter are well understood in the art so that a brief statement of the operation will suffice at this juncture.

A scanning beam within camera tube 10 is deflected in response to scanning fields created under the influence of sweep signals supplied by generators 11 and 12 and timed by generator 13. The deflection fields cause the cathode-ray beam to course the pickup screen of the tube in recurring and interlaced fields individually comprised of a succession of parallel lines. The video signal representing the televised scene occurs during a succession of line-trace intervals separated by line-retrace intervals. After amplification in video amplifier 14, the video signal is applied to mixer amplifier 15. Concurrently, synchronizing signals conveying timing information of the transmitter and occurring in line as well as field-retrace intervals are developed in generator 13 and are likewise applied to mixer amplifier 15 along with the line and field-pedestal components. Specifically, horizontal-synchronizing components are supplied from terminal H′ of generator 13 via attenuator 17 and vertical synchronizing and pedestal pulses as well as equalizing pulses are delivered to adder 16 from terminal F′ of this generator. There is thus produced in the output circuit of the mixer the usual composite television signal representing a combination of video and synchronizing components. This composite signal is modulated on a television or video carrier wave in unit 18 and, after amplification in amplifier 19, is applied through diplexer 24 to antenna system 23 for transmission to television receivers.

At the same time the accompanying audio information is converted into an audio signal in source 20 and modulated on the audio carrier wave in modulator 21. The audio carrier in amplified in amplifier 22 and likewise applied by means of diplexer 24 to antenna system 23 for radiation.

Consideration will now be given to the remaining components of the transmitter of FIGURE 1 which, in conjunction with units 16 and 17, constitute a coding arrangement integrated with the conventional parts of a television transmitter for the purpose of converting it to a subscription transmitter, that is, one which transmits a scrambled signal for reception by authorized or subscriber receivers only.

The coding method practiced with the arrangement under consideration contemplates developing two sets of synchronizing components, one of which conveys true-timing information of the transmitter while the other represents false-timing information, and both occur in line-retrace intervals. Generator 13 constitutes means for developing the set of true synchronizing components. It is coupled through attenuator 17 to adder 16 which accordingly receives attenuated horizontal or line-synchronizing components which are adjusted in amplitude to fall within the amplitude range normally set aside exclusively for video information. This results from the fact that the horizontal pedestal concurrently delivered to the adder is of negative polarity as will be described presently.

A delay line 30, having input terminals connected to horizontal-synchronizing pulse output terminal H of generator 13, is provided to supply false-synchronizing components, delayed in time with respect to the occurrence of the true-synchronizing components. This delay line is properly terminated at both ends in its characteristic impedance to avoid reflections which otherwise give rise to a multiplicity of false signals in response to each pulse received from generator 13. The output terminals of the delay line connect to adder 16 through a switch 31 which is included for a purpose to be made clear presently.

In addition to supplying false-synchronizing information, the coder includes means for introducing into the television signal, particularly during its trace intervals, a coding-signal component of such frequency and phase as to effect at least partial cancellation of the effectiveness of the synchronizing components of the television signal. To that end, there is provided unit 32 which may be a sine wave ringing circuit but has been shown as a sine wave oscillator having a synchronizing input terminal which connects with line-synchronizing terminal H of generator 13. This synchronization results in the generation of a sinusoidal signal which corresponds in frequency with, and is controlled in phase relative to, the horizontal-synchronizing components of generator 13. The output terminals of oscillator 32 also connect to an input of adder 16.

Most effective scrambling is achieved by additional means included in the coding mechanism for effectively interrupting the synchronizing components or the coding-signal component both of which are added into the television signal by way of adder 16. As illustrated, the false-synchronizing signals are interrupted by the operation of switch 31 under the influence of a control signal of rectangular wave form. The control signal is developed in a sine wave oscillator 33 which is coupled to a wave shaper 34 for converting the sinusoidal signal to a signal of rectangular wave form. The output circuit of wave shaper 34 connects to a control circuit of switch 31. This switch may conveniently take the form of a multi-grid amplifier which receives false-synchronizing signals from delay line 30 on one grid and a control or switching signal from wave shaper 34 on the other. As is well understood, such a switch may be operated, through appropriate selection of operating and bias potentials, to achieve a closed condition in which delay line 30 is effectively connected to adder 16 during positive half cycles of the controlling square wave and an alternative or open condition which, in effect, interrupts the coupling from line 30 to the adder during intervening negative half cycles of the controlling signal.

It has been determined that a switching frequency corresponding to an integral multiple, specifically an odd integral multiple of one-half the field frequency is optimum for the switching rate. Since the field frequency of a commercial television transmitter is 60 cycles, the preferred switching rates correspond to odd multiples of 30 cycles. Switching rates in the range from 30 to 500 cycles are most effective and an especially useful rate is 150 cycles per second. The preference for this interruption frequency will be explained hereinafter.

It has further been determined that the effectiveness of scrambling may be additionally enhanced by frequency modulating oscillator 33 at a rate that is low relative to the mean or nominal operating frequency of the oscillator. For that purpose, a reactance tube 35 is coupled to the oscillator as a frequency controlling device which modifies the operating frequency, in a manner well understood, in response to a control or modulating signal applied to the reactance tube. Such a modulating signal may be produced in a noise generator 36 which is coupled to the reactance tube. A suitable form of noise generator is disclosed in Patent 2,588,413 issued on March 11, 1952 in the name of E. M. Roschke and assigned to the same assignee as the present invention.

The noise generator comprises a blocking oscillator having some desired nominal operating frequency which may be modified by a noise signal delivered to the oscillator in superposed relation to the grid potential normally developed. As employed in the coder under consideration, the noise generator develops a random output signal having no frequency components exceeding 10 cycles per second and frequency modulates oscillator 33 up to approximately plus or minus 10 cycles per second.

As previously indicated, the true-synchronizing components are to be included in the transmitted signal suppressed in amplitude to a level included within the range that is usually devoted exclusively to video information. It is appropriate to suppress the horizontal blanking or pedestal pulse as well and this is accomplished by means of a polarity reversing amplifier 37 having an input terminal connected to generator 13 to receive the horizontal pedestal therefrom. Its output terminal connects to adder 16.

Figure 2:
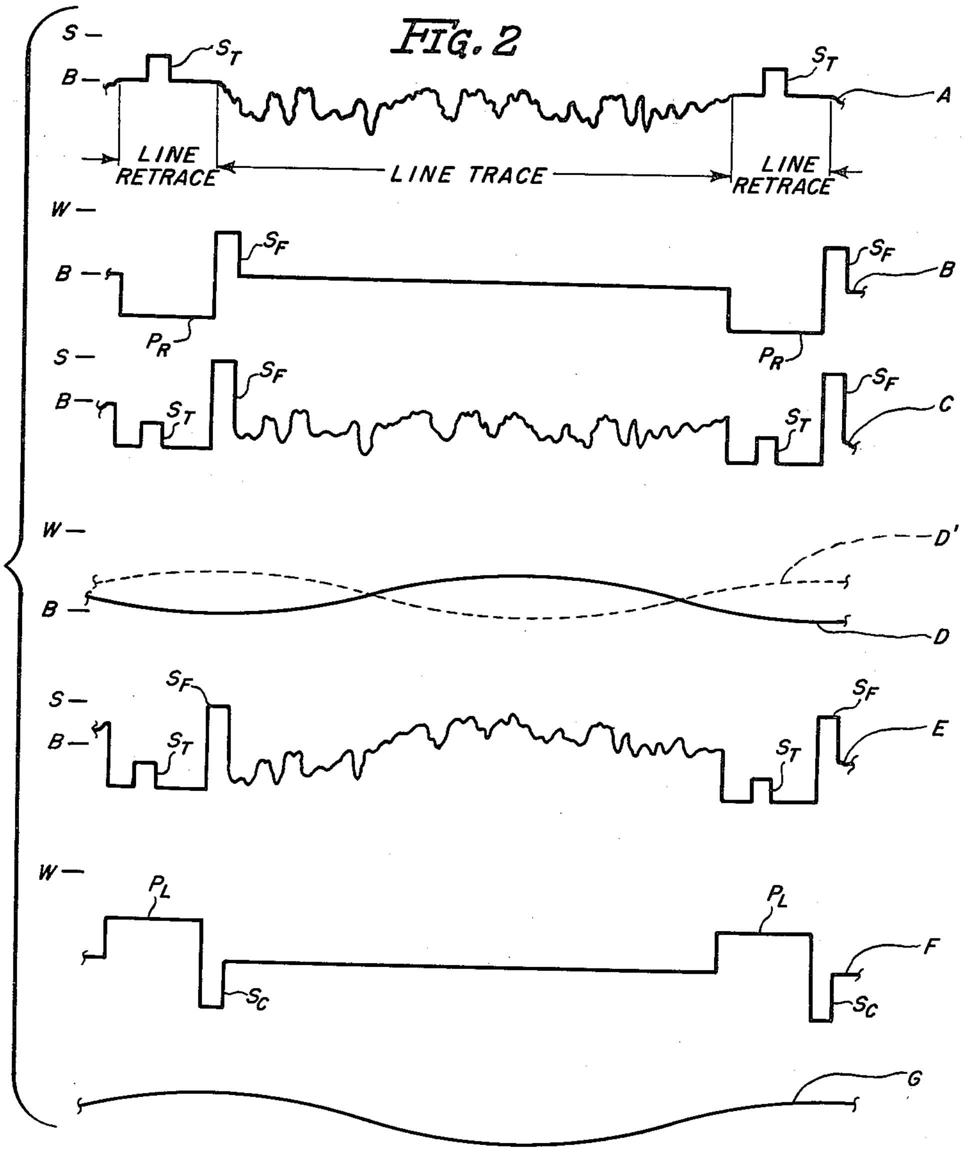

The operation of the coding mechanism in effecting the transmission of a coded or scrambled television signal will be explained in relation to the curves of FIGURE 2. Curve A represents a portion of the composite television signal developed in mixer amplifier 15 but restricted, for the moment, to the video information received from amplifier 14 and the true-synchronizing signals delivered from attenuator 17. The video information appears in recurring line-trace intervals as indicated while the synchronizing components $S_T$ occur in intervening retrace intervals. It will be observed that the amplitude of the synchronizing components $S_T$ does not extend to the normal sync amplitude represented by ordinate value S; rather it has been attenuated to a lesser value in unit 17. The suppression of this component into the video amplitude range results from the application of the reversed polarity line pedestal $P_R$ from amplifier 37 through adder 16 during line-retrace intervals. Its effect is to depress the normal line pedestal and line-synchronizing component $S_T$ into the amplitude range represented by the ordinate levels W—B of curve C.

False-synchronizing components $S_F$ are shown in curve B immediately succeeding the reversed polarity pedestal $P_R$. The time occurrence of the false-synchronizing signal is determined by the delay exhibited by line 30 and this, of course, may be chosen to meet the requirements of any given installation. If the system is intended to handle monochrome transmissions only, it is convenient so to time the false information that it falls, timewise, on the back porch of the normal line pedestal but where the system is to handle both monochrome and color transmissions it may be more desirable to have the false component following immediately upon the trailing edge of the back porch as indicated. This wider separation of the true and false-synchronizing components permits ready accommodation of the color-synchronizing information which, in accordance with current requirements of the Federal Communications Commission, is located on the back porch of the line pedestal. Obviously, positioning the false component to occur after the trailing edge of the pedestal has the effect of increasing the duration of the line-retrace interval which, for the purposes of this specification and the appended claims, may be defined as that interval which is devoted to synchronizing and pedestal information as distinguished from video information. It will be recognized that the encroachment of retrace into the line-trace interval is to be minimized so that if the false-synchronizing component follows the trailing edge of the line pedestal it may be very desirable to reduce its pulse duration. This may, of course, be accomplished by introducing a pulse generator between delay line 30 and switch 31 to develop a pulse having the timing imposed by the delay line and a preselected duration. It has been found that the system will perform satisfactorily where the false component has a duration of the order of the equalizing pulse which occurs in field-retrace intervals in ordinary television broadcasts. For simplification of the present discussion, however, the false signal is shown to have the same duration as the true-synchronizing signal.

The signal developed in mixer amplifier 15, taking into consideration the manner in which the signal of curve A is modified by the reversed polarity pedestal $P_R$ and the false-synchronizing component $S_F$, is shown in curve C. Analysis of this signal will demonstrate that the synchronizing information, viewed from the output of the synchronizing-signal separator of a convention television receiver responding to this signal, is conveyed by signal components including a fundamental occurring at the line rate and having a peak value in time coincidence with the false-synchronizing component $S_F$ as denoted by the broken line sinusoidal curve D′. The true timing component $S_T$, being depressed into the amplitude range reserved for video, does not appear in the output obtained from the separator and is ineffective. The coding signal component which is also introduced into the composite television signal from oscillator 32 through adder 16 is shown in full-line curve D. It is of the same frequency as, but in phase opposition to, the fundamental component D′ representing synchronizing information; hence, its positive peak is located approximately at the center of line-trace intervals, being somewhat delayed relative to mid-trace because timing component $S_F$ occurs on the back porch. Manifestly, the concurrence of these components within the composite television signal at least partially cancels the effectiveness of the apparent synchronizing information otherwise conveyed by false-synchronizing components $S_F$.

The final wave form of the signal delivered from mixer amplifier 15, at least with respect to line intervals, is represented by curve E. Its comparison with the signal of curve A emphasizes the modifications in significant characteristics of the composite television signal which result in scrambling. Specifically, the true-synchronizing components $S_T$ are depressed in each line-retrace interval to an amplitude level within the range conventionally assigned to video. The false-synchronizing components $S_F$ give the appearance of the usual synchronizing information because they extend from black level which is the upper limit of the amplitude range devoted to video to peak amplitude conveniently employed as a limit for synchronizing peaks. Their timing message however is inaccurate. Moreover, the video information is, in effect, pedestaled on a coding-signal component of sinusoidal wave form phased to elevate or exalt the video components occurring in the middle of line-trace intervals. This exaltation displaces shade levels that are normally near black level into the amplitude range B—S otherwise reserved for synchronizing information and tends to cause such video components to act as further false synchronizing information in a conventional receiver. Of course, if the pedestal effect is too great, the transmitter may be driven beyond its normal peak amplitude level from time to time which is undesirable. This may be avoided by restricting the peak-to-peak amplitude of the coding-signal component supplied by oscillator 32 to 25% of the S—W amplitude range. An acceptable peak-to-peak value is 10 to 15% of this amplitude range.

A further modification of the transmitted signal results from the intermittent nature of the false components $S_F$. They are interrupted at a rate determined by oscillator 33. A preferred operating frequency for that oscillator is 150 cycles per second which means that this false component which has a recurrence frequency corresponding to line frequency of 15,750 cycles per second is interrupted at a 150 cycle rate. In other words, the intervals in which the components appear are equal in duration to the intervals in which they are interrupted and the periodicity of the on-off condition has a mean value of 150 cycles per second. It is appropriate to refer to the mean frequency in view of the low frequency deviations imposed on oscillator 33 by noise generator 36 which deviations are very low with respect to the nominal operating frequency of the oscillator. Alternatively, by appropriately varying or selecting the duty cycle, the effective fundamental frequency component of the interruption signal can be varied and correspondingly the degree of cancellation produced by the exalted video signal can be adjusted.

The response of a conventional television receiver to such a transmission is an utterly unintelligible image and is uncomfortable to view. Such a receiver, in synthesizing a normal image, relies heavily upon the timing information of the received signal to have its cathode-ray beam course the image screen in a series of interlaced fields of parallel lines in an identical time pattern with that of the camera tube of the transmitter in developing the video signal. The horizontal component of timing information is of critical significance but the scrambled television signal radiated from the transmitter of FIGURE 1 does not present this necessary horizontal timing component in useful form. As previously explained, the presence of the coding-signal component of curve D in phase opposition to the fundamental component of the horizontal-timing signal shown in curve D′ cancels the effectiveness of the apparent horizontal-timing information of the radiation. While it need not entirely wash out the fundamental of the line-synchronizing component, it reduces its amplitude to the point where this component no longer predominates during the line-retrace interval. Instead, other signal components present in the transmission predominate and the receiver tends to synchronize on one of them. These other signal components constitute sideband energy produced at harmonics of the interruption frequency of the false synchronizing component $S_F$. In other words, the receiver tends to lock on a sideband component displaced from the synchronizing fundamental frequency by a multiple of the interruption frequency and establish the aforementioned side lock condition, a condition characterized by the fact that the receiver tends to synchronize on a sideband rather than upon the synchronizing component itself. At the same time, the interruption of the false-synchronizing component from time to time causes the pedestalled portion of the video information which projects beyond black level to mislead the receiver into recognizing the video signal as a source of timing information. When this is experienced, the horizontal system tends to lock in the middle of line-trace intervals. Because of the fact that the false-synchronizing component $S_F$ is interrupted from time to time, the receiver gyrates between a side lock and a mid-line phase condition resulting in a totally unintelligible image. It is found that the time constants of the automatic frequency control and automatic gain control systems of the conventional receiver derive totally erroneous controlling information from this scrambled television signal and are unable to impose the controlled operation of the scanning systems necessary to read and accurately translate an intelligible image from such a signal.

It has been stated above that an interruption frequency corresponding to an odd multiple of one-half field frequency is preferred. Its preference will be apparent from the following. Where the interruption frequency is an even multiple of field frequency, the horizontal scanning slips an integral number of cycles during the time of one field and as a consequence the images for successive fields are correctly superposed. On the other hand, if the interruption frequency is an odd integral multiple of one-half the field frequency, then during every other field the horizontal scanning lines are displaced by one-half the line-scanning interval. For this, the preferred interruption frequencies, the confusion in the video image is even greater since the superposed images in successive fields are now displaced by one-half the line-scanning interval. The decoding mechanism of FIGURE 3 may be coupled to a subscriber receiver to produce a high fidelity image in response to the received subscription telecast.

The decoding arrangement represented is of the antenna feed-in type, that is to say, it operates upon the received signal to effect decoding and develop a conventional television signal for application to the antenna terminals of the subscriber receiver. It includes a tuner 50 coupled to a receiving antenna system 51 and comprising a tunable radio-frequency amplifier, a heterodyning oscillator and a converter or first detector for selecting a particular television channel. The output terminals of tuner 50 are coupled to an intermediate-frequency amplifier 52 of any desired number of stages of amplification. One output terminal of that amplifier connects to an oscillator modulator 61. Preferably, an automatic gain control system 49 is coupled to an output circuit of amplifier 52 to operate upon the intermediate-frequency signal and develop a gain control potential for application to tuner 50 in the usual manner. The tuner serves as means for selecting the scrambled or coded subscription signal for application to modulator 61. Coupled to amplifier 52 is a detector 53 of narrow band width, employed as means for deriving a decoding signal corresponding in frequency to the coding-signal component or sine wave utilized as a video pedestal in the transmitter. A detector is employed for that purpose in the case at hand on the assumption that the coding component of the transmitter is radiated to the receiver as a modulation component of the audio carrier signal, as indicated by the connection from oscillator 32 to modulator 21 in FIGURE 1. Detector 53 is coupled to a tuned amplifier 54 which supplies the decoding-signal component to one input terminal of an adder 55.

In order to elevate the suppressed true-synchronizing information of the received subscription telecast, the decoder has means for developing a pedestal component occurring in retrace intervals, this means comprising a blocking oscillator 56. The pulse duration of that oscillator is controlled to correspond in duration to the line pedestals $P_R$ of the transmitted signal. That pulse output of the oscillator is also applied to adder 55.

The decoder additionally has means for effectively suppressing the false-synchronizing components $S_F$ of the received signal. Specifically, this means is a generator for developing a counterphase-synchronizing signal having components occurring in time coincidence with the false components $S_F$. The counterphase components are developed in a blanking circuit 57 having an input terminal connected to blocking oscillator 56 and including a wave-shaping circuit which, in response to the pulse output from oscillator 56, develops a pulse corresponding in duration to the false components $S_F$. The blanking circuit is likewise coupled to adder 55, serving as means for applying to an RF modulator 62 the pedestal pulse from oscillator 56, the counterphase pulse from circuit 57 and a decoding-signal component of sinusoidal wave form from amplifier 54.

Modulator 61 includes a local oscillator for supplying a heterodyning signal so related in frequency to the intermediate frequency of tuner 50 that the output signal of the modulator corresponds to a televiison channel assignment not otherwise employed by the subscriber's receiver to which the decoder is attached. The converted signal is subjected to another modulation in RF modulator 62 which receives the output of adder 55 as a modulating signal. The connection from the decoder to the subscriber's receiver is from modulator 62 to the antenna terminals of the receiver represented at 58. This receiver is the normal, commercially available instrument having stages of radio-frequency amplification and conversion, intermediate-frequency amplification, video detection and amplification as well as a cathode-ray type image reproducer and associated line and field-scanning systems for controlling the scansion of the cathode-ray beam of the reproducer. It will further be considered as including the usual sound system with appropriate stages of amplification and detection for energizing a sound reproducer such as a loud speaker. The connection from blanking circuit 57 to this receiver is for the purpose of blanking the picture tube during the intervals in which false-synchronizing components appear in the received signal to the end that they can have no effect on the reproduced image. A pick-up coil 59 is magnetically coupled to the horizontal-scanning system of receiver 58 as represented symbolically at M. It serves to develop a timing pulse occurring at the line frequency for application to an adder 60 interposed between amplifier 54 and blocking oscillator 56. It is included in an automatic phase control system for the oscillator to be explained more particularly hereinafter.

Figure 3:
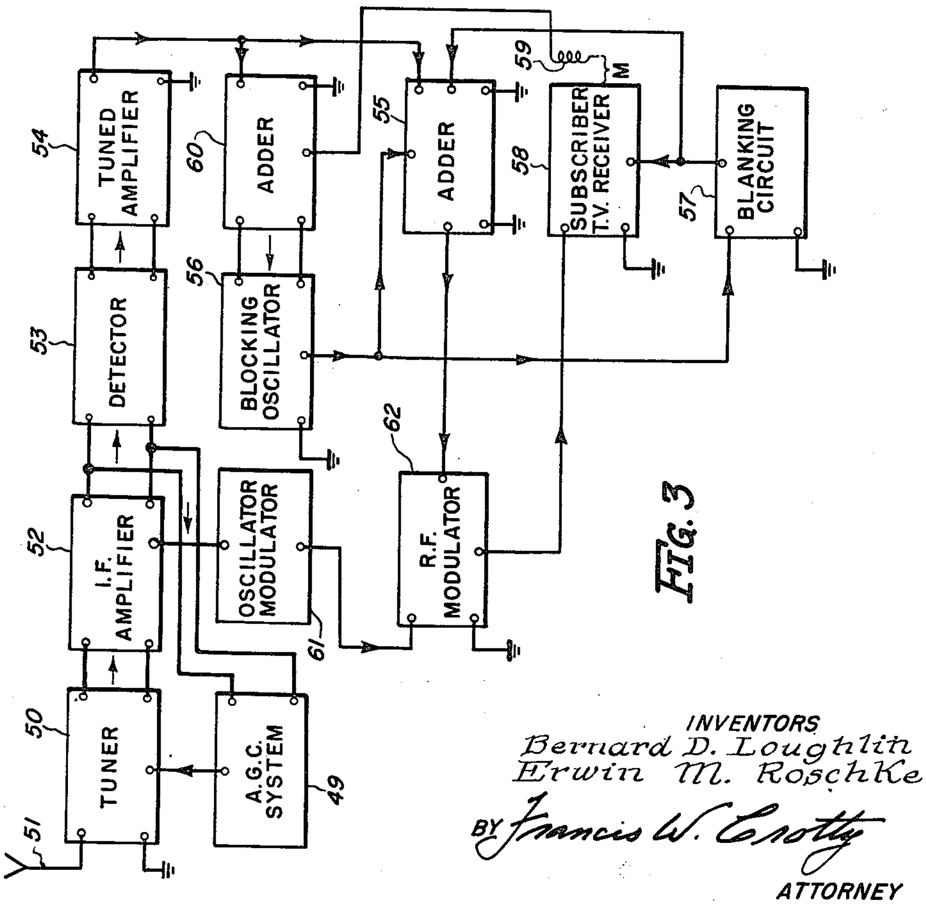
FIGURE 3 represents in block diagram a subscription receiver including one form of decoding mechanism constituting a particular apparatus embodiment of the invention.

The operation of the decoder of FIGURE 3 will be explained with reference to the curves of FIGURE 2. Manipulation of tuner 50 selects a desired television channel over which the subscription program is transmitted and supplies the selected signal through amplifier 52 to modulator 61. At the same time, the necessary decoding-signal component of sinusoidal wave form is derived in detector 53 from the audio carrier of the telecast and is supplied from tuned amplifier 54 to adder 55. If it be assumed that blocking oscillator 56 is operating in proper phase relation with respect to the received signal, a line-pedestal pulse $P_L$ is developed to occur in time coincidence with the pedestal $P_R$ of the received signal. Simultaneously, blanking circuit 57 responds to the pulse output $P_L$ of oscillator 56 and develops a counterphase signal $S_c$ which matches false-synchronizing signal $S_F$ but is of opposite polarity. Thus a correcting signal represented in curve F is developed by units 56 and 57 and applied to adder 55 concurrently with the decoding-signal component of curve G supplied by amplifier 54. These correcting signals are delivered from the adder to the modulating input of modulator 62 and their effects may be considered individually.

The decoding-signal component of curve G is of the same frequency but opposite polarity to the coding-signal component of curve D included in the received subscription signal. Its amplitude is adjusted to correspond to that of the signal of curve D so that these two components wash out or cancel one another in modulator 62.

The line-pedestal pulses $P_L$ occurring in time coincidence with pulses $P_R$ of the received signal serve to pedestal or elevate both the true-synchronizing component $S_T$ and its pedestal to restore component $S_T$ to its normal amplitude position shown in curve A. Specifically, the synchronizing component is elevated to extend from black level which is the upper limit of the video amplitude range toward peak carrier amplitude.

The counterphase components $S_C$, matching in duration and amplitude but opposing in phase the false components $S_F$, either completely delete the latter from the television signal or so suppress them in amplitude that they are negligible in effect. As a consequence, the wave form of the modulated carrier signal delivered by modulator 62 is similar to that of curve A except that the ratio of sync to picture amplitudes has been restored to that of a conventional television signal.

The carrier frequency however has been shifted from that of the received signal to a channel to which subscriber receiver 58 is adjusted. Accordingly, the signal applied to the antenna terminals of that receiver is to all practical purposes a conventional one and results in a reproduction of the televised image.

It is apparent that the correcting signals represented in curves F and G may be developed uninterruptedly in the decoder even though some portion of the received signal, specifically the false-synchronizing information, is intermittent. The presence of counterphase component $S_C$ during intervals in which the false components $S_F$ have been interrupted, has no adverse effect on the subscriber receiver. Since the decoding arrangement may supply the correcting signals on a continuous basis, the likelihood of objectionable flicker on the screen of the subscriber receiver is minimized and this is a decided advantage in any subscription system.

It will be appreciated that the decoder need not operate with its own tuner. It is of course understood that the signal to be corrected may be selected by the tuning mechanism of the subscriber receiver and be fed from the tuner or intermediate-frequency amplifier to a decoding arrangement which would correct the received signal as aforedescribed. In this case, however, it is not necessary to have the corrected signal take the form of a carrier corresponding in frequency to an assigned television channel. It may for example be an intermediate-frequency signal for application to the second detector of the subscriber's receiver. While no sound decoding arrangement has been shown, it will be included either as a component of the described decoder or as a self-contained sound decoder. In either event, a decoded sound signal is delivered to the audio system of the subscriber receiver. The details of sound decoding, however, are of no moment to the present invention.

The manner of accomplishing phase control of blocking oscillator 56 will be considered in relation to the curves of FIGURE 5. Curve H represents the portion of the composite television signal occurring in line-retrace with the restored true-synchronizing component $S_T$ on a horizontal pedestal. The broken horizontal line J denotes the normal firing level of oscillator 56 and curve K represents a portion of the decoding-signal component of sinusoidal wave form occurring at line frequency and supplied from amplifier 54 to accomplish a rough or coarse control of the phasing of the blocking oscillator. For the phase condition of the decoding sine wave represented in FIGURE 5, the pulse output of the oscillator occurs in the time interval $t_1$–$t_3$ and the desired phase relation is that represented by time interval $t_2$–$t_4$. The early firing of the oscillator depicted may, in the presence of certain types of image information, elevate video information occurring in the trailing portion of a line-trace interval into the amplitude range reserved for synchronizing information. In such case, the receiver tends to synchronize on video which is obviously to be avoided and points to the desirability of an AFC system.

Figure 4:
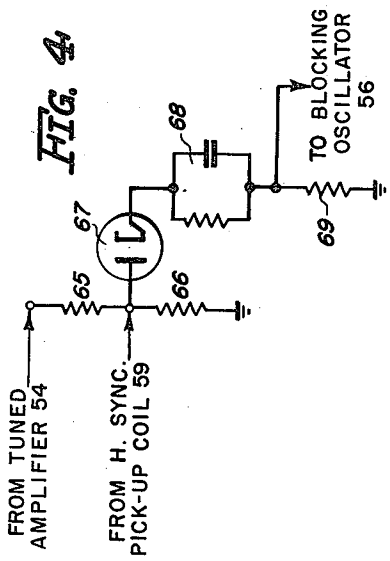
FIGURE 4 represents a circuit employed for automatic phase control in the decoder.

Prior to the time that oscillator 56 becomes stabilized as to phase, the pips $p$ induced into pick-up coil 59 during line-retrace intervals tend to vary their position with respect to the sine wave of curve K. As proper phasing is achieved, however, these pips tend to stabilize and establish a condition wherein the pip occurs at time $t_2$ and takes over phasing control exclusively. A circuit for achieving this result is represented in FIGURE 4 and is in the nature of a peak detector.

The sinusoidal decoding-signal component and the retrace pips are applied, as indicated, to a pair of series-connected resistors 65 and 66. A diode 67 has an anode connected to the junction of resistors 65, 66 and a cathode returned to ground through an RC network 68 and a load resistor 69. The discharge time constant of circuit 68 is long with respect to a line period and the synchronizing potential for the blocking oscillator is taken across resistor 69. Initially, the diode circuit, functioning as a conventional peak detector or rectifier, develops a bias at a level represented by horizontal line J'' such that only the peaks of the sinusoidal signal of curve K extend beyond this bias. Blocking oscillator 56 is so adjusted that, for this initial condition, it triggers at the time $t_1$. Any pip, such as $p_1$, which does not extend beyond the level J is ignored and has no effect in establishing the desired phase condition. In other words, initially the phase is established roughly under the influence of the sinusoidal signal of curve K alone.

It will be recognized, however, that the phase relation of the pips $p$ is changing with relation to the sinusoidal decoding signal because the automatic frequency control system of the receiver is not, for the assumed conditions, locked to the received signal. Ultimately, the pulses or pips $p$ become, in effect, pedestaled on the peak portion of the signal of curve K and take over control of the peak detector because they represent a greater peak amplitude than the condition wherein they occur down the slope of the sine wave. When they are so pedestaled the firing level, which was initially represented by broken line J, changes to that represented by broken line J' which is the desired phase condition. When this has been established, the automatic frequency control circuit of the receiver becomes locked to the received signal, the position of the pips becomes fixed relative to the sine wave of curve K, and proper decoding is accomplished.

A detail of blanking circuit 57 is represented in FIGURE 6. The circuit includes an input terminal extending from oscillator 56 through a differentiating circuit comprising a condenser 70 and a resistor 71. A diode 72 is connected across resistor 71 to suppress positive excursions of the differentiated signal. A resonant circuit 73 is also coupled across resistor 71. The pedestal pulse applied to the differentiating circuit from oscillator 56 is indicated in curve L of FIGURE 7. The differentiation of this pulse is represented in curve M. The positive signal excursion resulting from differentiation of the leading edge of the pulse is effectively wiped out by diode 72 whereas the negative-polarity pulse resulting from differentiation of the trailing edge of the pedestal is translated to ringing circuit 73. Excitation of this circuit develops the signal of curve N having a suppressed positive excursion due to the action of diode 72. This signal is derived for application to a wave shaping circuit which may be any well known device for sampling the negative polarity pulse of curve N within the limits represented by horizontal construction lines $N_1$, $N_2$. Amplification of this selected sample produces the desired counterphase signal of curve O. Ringing circuit 73 is a convenient device for developing a pulse of a desired duration. Its resonant frequency is such that the half period corresponds to the desired pulse width.

The connection from blanking circuit 57 to receiver 58 is one by which the counterphase pulse of curve O is applied to the input circuit of the cathode-ray tube of the receiver for the purpose of blanking the tube throughout the occurrence of the false-synchronizing information. Blanking the false information in this fashion avoids edge flicker that might otherwise result if the false pulse is not completely deleted from the received signal as it is applied from the decoder to the subscriber receiver.

The coding mechanism of FIGURE 1 may be modified to introduce two chopping or interruption rates to the application of false-synchronizing components to the composite television signal. An arrangement for accomplishing that type operation is represented in FIGURE 8. The first interruption rate has a mean value of 150 cycles per second and is occasioned under the influence of a 150 cycle square wave applied to switch 31 from wave shaper 34. This portion of the arrangement is similar to that of FIGURE 1, employing a sine wave oscillator 33 having a reactance tube 35 which receives a low frequency modulating signal from a noise generator 36 to accomplish low frequency deviations of oscillator 33 as explained hereinabove. The second interruption is introduced by a pulse generator 80 and an associated noise generator 81. Generator 80 may comprise a blocking oscillator type of frequency divider to the input circuit of which vertical-synchronizing pulses are supplied from generator 13 to be divided. The field rate is 60 cycles per second and the dividing factor is 6 so that the nominal pulse rate of generator 80 is 10. It may experience a low frequency deviation under the control of generator 81 in a manner described in conjunction with aforementioned Patent 2,588,413 to Roschke. A flip-flop or multi-vibrator circuit 82 is coupled to the output terminals of pulse generator 80 and, in turn, has its output terminals connected to a second control circuit of switch 31. The flip-flop circuit is a bi-stable device of known construction which converts the pulse output of generator 80 to a signal of rectangular wave form and a nominal value of 10 cycles per second. In this embodiment switch 31 may be an electron discharge device or vacuum tube having two control grids or gates either of which may interrupt signal translation through the device. Accordingly, the conjoint effect of the 150 cycle square wave from wave shaper 34 and the 10 cycle per second square wave from flip-flop 32 determine the application of the false-synchronizing components to adder 16.

A coder modified in the fashion of FIGURE 8 operates in generally the same manner as coding mechanism of FIGURE 1 differing primarily only in the fact that the occurrence of the false-synchronizing components are subject to two superposed interruption rates. This modification of the transmitter entails no changes at the receiver.

To the extent that the first-described embodiment of the invention permits the uninterrupted application of correcting signals to the decoder of the receiver, it is indeed desirable although some modification of the transmitter is possible if it is convenient to apply one or more of the correcting signals in the decoder in accordance with an interruption or coding program. FIGURE 9 represents a portion of the coder modified with this end in view. In this case the connection from terminal H' of synchronizing-signal generator 13 to adder 16 is through a controllable gain amplifier 90. Amplifier 90 will be considered to have two conditions of gain. In the first such condition, a line-synchronizing pulse and its pedestal are applied to adder 16 with the amplitude level required to otherwise fabricate a conventional composite television signal in mixer amplifier 15, that is to say, at least in so far as the appearance of the line-synchronizing pulse and its pedestal are concerned. The alternate gain condition of this amplifier is one wherein the amplitude level of the line-synchronizing component and its pedestal is reduced to fall mid-way of the amplitude range of the picture carrier signal normally devoted exclusively to video information. The amplifier is switched between these alternative operating conditions in response to the control signal of rectangular wave form delivered by wave shaper 34. This unit, as in the first-described embodiment, receives a sinusoidal signal having a nominal frequency of 150 cycles per second and a low order frequency modulation of approximately plus or minus 10 cycles per second. Unit 33' representing the frequency modulated sine wave oscillator will be understood to include a controlling reactance tube and noise generator as explained in conjunction with the discussion of the embodiment of FIGURE 1. It will be appreciated that functionally the change in gain of amplifier 90 is similar to the interruption of the false-synchronizing component in the first-described embodiment.

In addition to periodically suppressing the synchronizing component, one may also interrupt the sinusoidal coding component serving both as a pedestal for the video frequency information in the middle of line-trace intervals and also to cancel the effectiveness of the synchronizing information. Interruption of this component may be accomplished by delivering the sinusoidal coding signal from sine wave oscillator 32 through switch 31 to adder 16. The rectangular-shaped control signal from wave shaper 34 may again be used to operate the switch.

It will be recognized that with this type of transmitter operation it is necessary to indicate to subscriber receivers the intervals in which the synchronizing information has been suppressed and/or the sinusoidal coding-signal component has been interrupted. That information is conveniently supplied to subscriber receivers in the form of a modulated key signal. Such a signal is developed in a generator 91 and applied to a modulator 92 which also receives, as a modulating signal, the output of wave shaper 34. A carrier or sub-carrier component thus modulated to represent the code schedule imposed on the transmitter by wave shaper 34 may be disseminated to subscribers as a component of the radiation or, if desired, by a conductive wire link.

The modification required of the decoding mechanism when the coding device is constructed in accordance with the arrangement of FIGURE 9 is represented in FIGURE 10. It includes a switch 100 through which the decoding-signal component of sinusoidal wave form and corresponding to the line frequency is delivered to adder 55. It further includes a key signal detector 101, assuming that the modulated key signal is delivered as a modulation component of the subscription telecast. This detector is supplied from intermediate-frequency amplifier 52 and develops a control signal which corresponds in wave form and phase to that developed by wave shaper 34 of the coding mechanism of FIGURE 9. That signal is applied to switch 100 and to a second switch 102 through which the output of oscillator 56 is applied to adder 55 which is coupled to modulator 62.

The subscription system including the modified coding and decoding mechanisms of FIGURES 9 and 10, respectively, may be operated in various ways. It will be assumed initially that switch 31 at the coder and switch 100 at the decoder remain permanently closed. For this condition the operation is similar to that of the transmitter of FIGURE 1 except that it does not employ false-synchronizing information. Instead, the true-synchronizing component is transmitted in the customary fashion during certain time intervals and, in alternate time intervals, it is suppressed to be concealed within the amplitude range of the carrier devoted to video. In other words, it is a transmission in which the synchronizing information is suppressed from time to time at a rate determined by the control signal delivered by wave shaper 34. The sinusoidal coding component, corresponding in frequency but opposite in phase to the fundamental of the line-synchronizing component, is continuously applied to the transmission in the manner of the transmitter of FIGURE 1. Moreover, the code schedule representing the times in which the synchronizing component is suppressed is disseminated to subscriber receivers as a modulation component of the transmission.

At the receiver station, blocking oscillator 56 applies to switch 102 the pedestal to elevate the depressed synchronizing component when required and the sinusoidal decoding-signal component is continuously applied to adder 55. The key signal from detector 101 permits the pedestal to be delivered from oscillator 56 to adder 55 only during those of the retrace intervals in which synchronizing components of the transmission are suppressed. In other words, adder 55 derives the correcting signals for application to modulator 62 to effect pedestalling or exaltation of the suppressed synchronizing components to cancel or suppress the effect of the sinusoidal coding-signal component of the transmission and to leave untouched the true synchronizing components received in normal fashion from time to time. In this manner a conventional television signal is reconstituted for utilization in the subscriber receiver. Obviously, there is no need for any counterphase synchronizing component in this mechanism and, accordingly, blanking circuit 57 is omitted.

In another mode of operation, switch 31 is operated by the control signal from wave shaper 34 and the companion switch 100 at the decoder functions in response to the control signal from key signal detector 101. The effect of the control signals on these switches may cause the sinusoidal signal to be interrupted during intervals when the synchronizing component has its normal aspect in the television signal or, alternatively, when the synchronizing component has been suppressed. The scrambling results are different in the two cases.

In the first-mentioned mode of operation, the sinusoidal signal is present along with the line-synchronizing components and has the effect of cancelling such components to establish the side lock condition as previously described. The scrambling resulting from this type operation is similar to that explained in conjunction with the arrangement of FIGURE 1. The decoder of FIGURE 10 decodes this scramble by operating switch 100 to present to adder 55 the decoding component during intervals in which switch 102 opens the transmission path from oscillator 56 to adder 55. Expressed in other terms, the decoding-signal component is applied through controlled operation of switch 100 to adder 55 during operating intervals in which the corresponding coding-signal component is present in the received signal.

Another mode of operation contemplates operating switch 31 at the coder to add in the sinusoidal coding component during intervals in which wave shaper 34 effects suppression with the synchronizing information. To correct this sort of scrambled signal, switch 100 at the decoder is operated to present to adder 55 the decoding-signal component during the intervals in which switch 102 permits the pedestal pulse from oscillator 56 to be supplied to the adder. The unauthorized receiver receiving this transmission tends to lock alternately at the end of the line-trace and at the mid-point of line-trace and hunts back and forth. It is an acceptable scramble although it does not necessarily achieve the complete destruction of video intelligence characteristic of the aforedescribed side lock condition.

Side lock scramble can also be attained with a coder modification like that of FIGURE 9 if the synchronizing information is present in each line-retrace at its usual amplitude level but the sinusoidal coding-signal component, serving as a video pedestal, is interrupted from time to time. Operation in this manner may be realized by establishing a fixed gain level in amplifier 90 and interrupting the sinusoidal component from oscillator 32 by having wave shaper 34 control only switch 31. Of course, this necessitates advising subscriber receivers of those intervals in which the sinusoidal code signal is employed. Such advice may again be transmitted through the use of key signal generator 91 and modulator 92 receiving the output of wave shaper 34 as a modulating signal. The decoding structure of FIGURE 10 may be employed to decode such a telecast but in this instance switch 102 may be left open because it is not necessary to reconstruct synchronizing information.

In order to attain truly precise decoding in the purest sense, the operation at the receiver decoder should be exactly complementary to the coding adopted at the transmitter. In particular, this high degree of perfection in decoding may be realized by operating upon the decoded video signal with a component of sinusoidal waveform to eradicate the coding signal added at the transmitter as a pedestal during line-trace intervals. Actually, such a degree of perfection is not required and the arrangement as described provides entirely adequate unscrambling or decoding of the transmission without perceptible degradation of picture.

The coding signal component of sinusoidal waveform employed in the several described embodiments of the invention corresponds to and is locked with the fundamental of the line-synchronizing frequency of 15,750 kilocycles. If desired, this coding signal may be selected to be equal to the fundamental of horizontal frequency plus or minus integral multiples of 60, considering 1 as a possible integer of multiplication. So long as this signal frequency is stable or locked in relation to the fundamental of the line-synchronizing frequency, there will be freedom from flicker and these different values of frequency for the sine-wave pedestal component produce a great tendency to the desired side-lock condition. Actually, one might also use a coding signal which differs from the fundamental of the line frequency by 30 cycles but here there is a possibility of objectionable flicker unless cancellation of the coding signal is very precisely obtained. Greater latitude results if the coding signal frequency differs from line frequency by multiples of 60 cycles.

The side-lock form of video scramble is accomplished by operating upon the signal derived from mixer amplifier 15 and it will be apparent that the video components, for example, might have been subjected to an additional scramble or coding before their application to the mixer amplifier. In such a case, the first coding technique may be of marginal value from the standpoint of picture destruction because the added destruction supplied by the side-lock scramble will give a final video scramble of excellent quality. In other words, the side-lock type of scramble may be used in conjunction with and in addition to other known forms of video scramble. A simple illustration of a video scramble that combines readily with side lock is that obtained by changing one of the scanning directions from time to time at the transmitter.

By way of review, preferred forms of encoding devices constructed in accordance with the invention include means for deriving a television signal having video information in recurring line-trace intervals and synchronizing components in recurring line-retrace intervals. At the transmitter this means includes a camera tube and at the receiver it comprises the tuner. Additional means are provided for deriving an encoding signal component having a frequency corresponding approximately, and preferably precisely to line frequency. The sinusoidal oscillator 32 of the transmitter serves as this means and the detector and tuned amplifier 54 are the counterparts of the decoder. Finally, there are further means in the encoder for introducing the encoding signal, particularly in the trace intervals of the television signal, in phase opposition to the synchronizing components thereof and with such amplitude as to modify the effectiveness of the synchronizing components. At the transmitter, matrix 15 introduces the sinusoidal coding component continuously, both during line-trace and retrace intervals, and it tends to cancel the effectiveness of the synchronizing components. At the decoder, modulator 62 introduces the sinusoidal decoding signal continuously, both in line-trace and retrace intervals, in order to restore the effectiveness of the synchronizing components.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. An encoding arrangement for a subscription television system comprising: means for deriving a television signal having video information in recurring line-trace intervals and synchronizing components in recurring line-retrace intervals; means for deriving an encoding signal component of approximately sinusoidal waveform and having a frequency corresponding approximately to line frequency; and means for introducing said encoding signal at least into said trace intervals of said television signal in phase opposition to said synchronizing components and of such amplitude as to modify the effectiveness of said synchronizing components.

2. A subscription television transmitter comprising: means for developing a video signal representative of a televised scene and occurring during a succession of trace intervals separated by retrace intervals; means for developing a synchronizing signal including components conveying timing information and occurring in said retrace intervals; means for combining said video and synchronizing signals to develop a television signal for transmission to subscriber receivers; means for effectively introducing into said television signal during said trace intervals thereof a coding-signal component of such frequency and phase as to effect at least partial cancellation of said synchronizing signal; and means for effectively interrupting at least one of said components from time to time.

3. A subscription television transmitter comprising: means for developing a video signal representative of a televised scene and occurring during a succession of trace intervals recurring at a predetermined line frequency and separated by retrace intervals; means for developing a synchronizing signal including components conveying timing information and occurring in said retrace intervals; means for combining said video and synchronizing signals to develop a television signal for transmission to subscriber receivers; means for effectively introducing into said television signal during said trace intervals thereof a coding-signal component having a frequency corresponding to said line frequency and phased to have a peak approximately at the center of said trace intervals to effect at least partial cancellation of said synchronizing signal; and means for effectively interrupting at least one of said components from time to time.

4. A subscription television transmitter comprising: means for developing a video signal representative of a televised scene and occurring during a succession of trace intervals recurring at a predetermined line frequency and separated by retrace intervals, said line trace and retrace intervals defining image fields which recur at a predetermined field frequency; means for developing a synchronizing signal including components conveying timing information and occurring in said retrace intervals; means for combining said video and synchronizing signals to develop a television signal for transmission to subscriber receivers; means for effectively introducing into said television signal during said trace intervals thereof a coding-signal component having a frequency corresponding approximately to said line frequency and such a phase as to effect at least partial cancellation of said synchronizing signal; and means for effectively interrupting at least one of said components at a frequency corresponding to an integral multiple of one-half said field frequency.

5. A subscription television transmitter comprising: means for developing a video signal representative of a televised scene and occurring during a succession of trace intervals recurring at a predetermined line frequency and separated by retrace intervals, said line trace and retrace intervals defining image fields which recur at a predetermined field frequency; means for developing a synchronizing signal including components conveying timing information and occurring in said retrace intervals; means for combining said video and synchronizing signals to develop a television signal for transmission to subscriber receivers; means for effectively introducing into said television signal during said trace intervals thereof a coding-signal component having a frequency corresponding approximately to said line frequency and such a phase as to effect at least partial cancellation of said synchronizing signal; and means for effectively interrupting at least one of said components at a frequency corresponding to an odd integral multiple of one-half said field frequency.

6. A subscription television transmitter comprising: means for developing a video signal representative of a televised scene and occurring during a succession of trace intervals recurring at a predetermined line frequency and separated by retrace intervals, said line trace and retrace intervals defining image fields which recur at a predetermined field frequency; means for developing a synchronizing signal including components conveying timing information and occurring in said retrace intervals; means for combining said video and synchronizing signals to develop a television signal for transmission to subscriber receivers; means for effectively introducing into said television signal during said trace intervals thereof a coding-signal component having a frequency corresponding approximately to said line frequency and such a phase as to effect at least partial cancellation of said synchronizing signal; and means for effectively interrupting at least one of said components at a frequency corresponding to an odd integral multiple of one-half said field frequency and within the frequency from 30 to approximately 300 cycles per second.

7. A subscription television transmitter comprising: means for developing a video signal representative of a televised scene and occurring during a succession of trace intervals separated by retrace intervals; means for developing a synchronizing signal including components conveying timing information and occurring in said retrace intervals; means for combining said video and synchronizing signals to develop a television signal for transmission to subscriber receivers; means for effectively introducing into said television signal during said trace intervals thereof a coding signal component of such frequency and phase as to effect at least partial cancellation of said synchronizing signal; and means for effectively interrupting said synchronizing signal from time to time.

8. A subscription television transmitter comprising: means for developing a video signal representative of a televised scene and occurring during a succession of trace intervals recurring at a predetermined line frequency and separated by retrace intervals; means for developing a synchronizing signal including components conveying timing information and occurring in said retrace intervals; means for combining said video and synchronizing signals to develop a television signal for transmission to subscriber receivers; means for effectively introducing into said television signal during said trace intervals thereof a coding-signal component having a frequency corresponding approximately to said line frequency and such a phase as to effect at least partial cancellation of said synchronizing signal; and means for effectively interrupting at least one of said components at a certain mean frequency and varying said interruption frequency at a rate which is low with respect thereto.

9. A subscription television transmitter comprising: means for developing a video signal representative of a televised scene and occurring during a succession of trace intervals separated by retrace intervals; means for developing one set of synchronizing components conveying true timing information and another set, delayed with respect to said one set, conveying false timing information, both said sets having components occurring in said retrace intervals; means for combining said video and both sets of synchronizing components to develop a television signal for transmission to subscriber receivers in which said video and one set of synchronizing components are confined to a fixed range of amplitude levels while said other set of synchronizing components is established at an amplitude level exceeding said range; and means for effectively introducing into said television signal during said trace intervals thereof a coding-signal component of such frequency and phase as to effect at least partial cancellation of said other set of synchronizing components.

10. A subscription television transmitter comprising: means for developing a video signal representative of a televised scene and occurring during a succession of trace intervals separated by retrace intervals; means for developing one set of synchronizing components conveying true timing information and another set conveying false timing information, both said sets having components occurring in said retrace intervals; means for combining said video and both sets of synchronizing components to develop a television signal for transmission to subscriber receivers in which said video and one set of synchronizing components are confined to a fixed range of amplitude levels while said other set of synchronizing components is established at an amplitude level exceeding said range; means for effectively introducing into said television signal during said trace intervals thereof a coding-signal component of such frequency and phase as to effect at least partial cancellation of said other set of synchronizing components; and means for effectively interrupting said other set of synchronizing components from time to time.

11. A subscription television transmitter comprising: means for developing a video signal representative of a televised scene and occurring during a succession of trace intervals recurring at a predetermined line frequency and separated by retrace intervals; means for developing one set of synchronizing components conveying true timing information and another set conveying false timing information, both said sets having components occurring in said retrace intervals; means for combining said video and both sets of synchronizing components to develop a television signal for transmission to subscriber receivers in which said video and one set of synchronizing components are confined to a fixed range of amplitude levels while said other set of synchronizing components is established at an amplitude level exceeding said range; means for effectively introducing into said television signal a coding-signal component of sinusoidal waveform having a frequency corresponding to said line frequency and phased to have a peak occur approximately at the center of the trace portion of said television signal to effect at least partial cancellation of said other set of synchronizing components; and means for effectively interrupting said other set of synchronizing components from time to time.

12. A subscription television transmitter comprising: means for developing a video signal representative of a televised scene and occurring during a succession of trace intervals recurring at a predetermined line frequency and separated by retrace intervals; means for developing one set of synchronizing components conveying true timing information and another set conveying false timing information, both said sets having components occurring in said retrace intervals; means for combining said video and both sets of synchronizing components to develop a television signal for transmission to subscriber receivers in which said video and one set of synchronizing components are confined to a fixed range of amplitude levels while said other set of synchronizing components is established at an amplitude level exceeding said range; means for effectively introducing into said television signal a coding-signal component of sinusoidal waveform having a frequency corresponding approximately to said line frequency, a peak-to-peak amplitude less than 50 percent of said amplitude range, and phased to have a peak occur approximately at the center of the trace portion of said television signal to effect at least partial cancellation of said other set of synchronizing components; and means for effectively interrupting said other set of synchronizing components from time to time.

13. A subscription television transmitter comprising: means for developing a video signal representative of a televised scene and occurring during a succession of trace intervals recurring at a predetermined line frequency and separated by retrace intervals; means for developing a synchronizing signal including components conveying timing information and occurring in said retrace intervals; means for combining said video and synchronizing signals to develop a television signal for transmission to subscriber receivers; means for effectively introducing into said television signal during said trace intervals thereof a coding-signal component having a frequency corresponding approximately to said line frequency and such a phase as to effect at least partial cancellation of said synchronizing signal; and means for effectively interrupting at least one of said components at two different frequencies concurrently, one of said interruption frequencies being low relative to the other.

14. A subscription television transmitter comprising: means for developing a video signal representative of a televised scene and occurring during a succession of trace intervals recurring at a predetermined line frequency and separated by retrace intervals, said line trace and retrace intervals defining image fields which recur at a predetermined field frequency; means for developing a synchronizing signal including components conveying timing information and occurring in said retrace intervals; means for combining said video and synchronizing signals to develop a television signal for transmission to subscriber receivers; means for effectively introducing into said television signal during said trace intervals thereof a coding-signal component having a frequency corresponding to said line frequency and such a phase as to effect at least partial cancellation of said synchronizing signal; and means for effectively interrupting at least one of said components at two different frequencies one of said interruption frequencies being an integral multiple of one-half said field frequency and the other being low relative to said field frequency.

15. A subscription television transmitter comprising: means for developing a video signal representative of a televised scene and occurring during a succession of trace intervals recurring at a predetermined line frequency and separated by retrace intervals; means for developing a synchronizing signal including components conveying timing information and occurring in said retrace intervals; means for combining said video and synchronizing signals to develop a television signal for transmission to subscriber receivers in which said video is confined to a fixed range of amplitude levels while said synchronizing signal is normally established at an amplitude level exceeding said range; means for effectively introducing into said television signal during said trace intervals thereof a coding-signal component of sinusoidal waveform having a frequency corresponding approximately to said line frequency and phased to have a peak occur approximately at the center of the trace portion of said television signal to effect at least partial cancellation of said synchronizing signal; and means for effectively suppressing said synchronizing signal from time to time to fall within said fixed amplitude range.

16. A subscription television transmitter comprising: means for developing a video signal representative of a televised scene and occurring during a succession of trace intervals separated by retrace intervals; means for developing a synchronizing signal including components conveying timing information and occurring in said retrace intervals; means for combining said video and synchronizing signals to develop a television signal for transmission to subscriber receivers; means for effectively introducing into said television signal during said trace intervals thereof a coding-signal component of such frequency and phase as to effect at least partial cancellation of said synchronizing signal; and means for effectively interrupting both said synchronizing signal and said coding-signal component from time to time.

17. In a subscription television system for utilizing a scrambled signal including a carrier wave modulated within a fixed amplitude range with video during line-trace intervals, modulated during line-retrace intervals with synchronizing components having an amplitude exceeding said range and further modulated by a coding-signal component occurring at approximately line frequency in phase opposition to said synchronizing components and serving as a pedestal to exalt said video in the central portion of said trace intervals, and further characterized by the fact that at least one of said synchronizing and coding-signal components is interrupted from time to time, a decoding mechanism comprising: a carrier-frequency modulator; means for selecting said scrambled signal and for applying it to said modulator; means for deriving a decoding-signal component corresponding in frequency to said coding-signal component and for applying it to said modulator only during the occurrence of said coding signal and in such phase and amplitude as to effect cancellation of said coding component from said scrambled signal; means for developing a synchronizing-signal-restoring component and for applying it to said modulator, at least during retrace intervals in which true synchronizing information may have been interrupted to establish in each such interval a synchronizing component exceeding said amplitude range; and means for deriving from said modulator an unscrambled signal with said true-synchronizing components predominating during line-retrace intervals and for utilizing said unscrambled signal to reproduce a televised image.

18. In a subscription television system for utilizing a scrambled signal including a carrier wave modulated within a fixed amplitude range with video during line-trace intervals, within said range with true-synchronizing components during line-retrace intervals, beyond said range with false-synchronizing components occurring intermittently in said retrace intervals and further modulated by a coding-signal component occurring at approximately line frequency in phase opposition to said synchronizing components and serving as a pedestal to exalt said video in the central portion of said trace intervals, a decoding mechanism comprising: a carrier-frequency modulator; means for selecting said scrambled signal and for applying it to said modulator; means for deriving a decoding-signal component corresponding in frequency to said coding-signal component and for applying it to said modulator in such phase and amplitude as to effect cancellation of said coding-signal component from said scrambled signal; means for developing a pedestal component occurring during said retrace intervals and for applying it to said modulator in such phase and amplitude as to raise said true-synchronizing components to an amplitude level exceeding said range; means coupled to modulator for effectively suppressing said false-synchronizing components from said scrambled signal; and means for deriving from said modulator an unscrambled signal with said true synchronizing components predominating during line-retrace intervals and for utilizing said unscrambled signal to reproduce a televised image.

19. In a subscription television system for utilizing a scrambled signal including a carrier wave modulated within a fixed amplitude range with video during line-trace intervals, within said range with true-synchronizing components during line-retrace intervals, beyond said range with false-synchronizing components occurring intermittently in said retrace intervals and further modulated by a coding-signal component occurring at approximately line frequency in phase opposition to said synchronizing components and serving as a pedestal to exalt said video in the central portion of said trace intervals, a decoding mechanism comprising: a carrier-frequency modulator; means for selecting said scrambled signal and for applying it to said modulator; means for deriving a decoding-signal component corresponding in frequency to said coding-signal component and for applying it to said modulator in such phase and amplitude as to effect cancellation of said coding-signal component from said scrambled signal; means for developing a synchronizing pedestal component and a counterphase-synchronizing component, respectively, occurring during the portions of said retrace intervals including said true-synchronizing component and said false-component, when present; means for applying said pedestal and counterphase components to said modulator in such phase and amplitude as to raise said true-synchronizing components to an amplitude level exceeding said range and to suppress said false components; and means for deriving from said modulator an unscrambled signal with said true-synchronizing components predominating during line-retrace intervals and for utilizing said unscrambled signal to reproduce a televised image.

20. In a subscription television system for utilizing a scrambled signal including a carrier wave modulated within a fixed amplitude range with video during line-trace intervals, within said range with true-synchronizing components during line-retrace intervals, beyond said range with false-synchronizing components occurring intermittently in said retrace intervals and further modulated by a coding-signal component occurring at approximately line frequency in phase opposition to said synchronizing components and serving as a pedestal to exalt said video in the central portion of said trace intervals, a decoding mechanism comprising: a carrier-frequency modulator; means for selecting said scrambled signal and for applying it to said modulator; means for deriving a decoding-signal component corresponding in frequency to said coding-signal component and for applying it to said modulator in such phase and amplitude as to effect cancellation of said coding-signal component from said scrambled signal; means for developing a pedestal component occurring during said retrace intervals for applying it to said modulator in such phase and amplitude as to raise said true-synchronizing components to an amplitude level exceeding said range; means for developing a counterphase-synchronizing signal having components occurring in time coincidence with said false components and for applying said counterphase components to said modulator to suppress said false-synchronizing components from said scrambled signal; and means for deriving from said modulator an unscrambled signal with said true-synchronizing components predominating during line-retrace intervals and for utilizing said unscrambled signal to reproduce a televised image.

21. In a subscription television system for utilizing a scrambled signal including a carrier wave modulated within a fixed amplitude range with video during line-trace intervals, within said range with true-synchronizing components during line-retrace intervals, beyond said range with false-synchronizing components occurring intermittently in said retrace intervals and further modulated by a coding-signal component occurring at approximately line frequency in phase opposition to said synchronizing components and serving as a pedestal to exalt said video in the central portion of said trace intervals, a decoding mechanism comprising: a carrier-frequency modulator; means for selecting said scrambled signal and for applying it to said modulator; means for deriving a decoding-signal component corresponding in frequency to said coding-signal component and for applying it to said modulator in such phase and amplitude as to effect cancellation of said coding component from said scrambled signal; means for developing a pedestal component occuring during said retrace intervals for applying it to said modulator in such phase and amplitude as to raise said true-synchronizing components to an amplitude level exceeding said range; means coupled to modulator for effectively suppressing said false-synchronizing components from said scrambled signal; means for deriving from said modulator and unscrambled signal with said true-synchronizing components predominating during line-retrace intervals; a television receiver, having a line and field-scanning system, coupled to said last-named means for utilizing said unscrambled signal to reproduce a televised image; and a frequency-control system coupled to said scanning system of said receiver for maintaining said pedestal component in predetermined phase relation to said retrace intervals.

22. In a subscription television system for utilizing a scrambled signal including a carrier wave modulated within a fixed amplitude range with video during line-trace intervals, within said range with true-synchronizing components during line-trace intervals, beyond said range with false-synchronizing components occurring intermittently in said retrace intervals and further modulated by a coding-signal component occurring at approximately line frequency in phase opposition to said synchronizing components and serving as a pedestal to exalt said video in the central portion of said trace intervals, a decoding mechanism comprising: a carrier-frequency modulator; means for selecting said scrambled signal and for applying it to said modulator; a source for supplying a decoding-signal component corresponding in frequency to said coding-signal component and for applying it to said modulator in such phase and amplitude as to effect cancellation of said coding-signal component from said scrambled signal; means for developing a pedestal component occurring during said retrace intervals for applying it to said modulator in such phase and amplitude as to raise said true-synchronizing components to an amplitude level exceeding said range; means coupled to modulator for effectively suppressing said false-synchronizing components from said scrambled signal; means for deriving from said modulator and unscrambled signal with said true-synchronizing components predominating during line-retrace intervals; a television receiver, having a line and field-scanning system, coupled to said last-named means for utilizing said unscrambled signal to reproduce a televised image; and a frequency-control system coupled to said scanning system of said receiver and to said decoding-signal source for maintaining said pedestal component in predetermined phase relation to said retrace intervals.

23. In a subscription television system for utilizing a scrambled signal including a carrier wave modulated within a fixed amplitude range with video during line-trace intervals, modulated during line-retrace with synchronizing components exceeding said amplitude range but from time to time being suppressed within said range and further modulated by a coding-signal component occurring at approximately line frequency in phase opposition to said synchronizing components and serving as a pedestal to exalt said video in the central portion of said trace intervals, a decoding mechanism comprising: a carrier-frequency modulator; means for selecting said scrambled signal and for applying it to said modulator; means for deriving a decoding-signal component corresponding in frequency to said coding-signal component and for applying it to said modulator in such phase and amplitude as to effect cancellation of said coding-signal component from said scrambled signal; means for developing a pedestal component occurring during only such of said retrace intervals in which said synchronizing components are suppressed and for applying it to said modulator in such phase and amplitude as to raise said suppressed synchronizing components to an amplitude level exceeding said range; means coupled to modulator for effectively suppressing said false-synchronizing components from said scrambled signal; and means for deriving from said modulator an unscrambled signal with said true-synchronizing components exceeding said amplitude range in each of said line-retrace intervals and for utilizing said unscrambled signal to reproduce a televised image.

24. A method of subscription television which comprises the steps of: developing a video signal representative of a televised scene and occurring during a succession of trace intervals separated by retrace intervals; developing a synchronizing signal including components conveying timing information and occurring in at least certain of said retrace intervals; combining said video and synchronizing signals to develop a television signal for transmission to subscriber receivers; and effectively introducing into said television signal at least during certain of said trace intervals thereof a coding-signal component of such frequency and phase as to effect at least partial cancellation of said synchronizing signal.

25. A method of subscription television which comprises the steps of: developing a video signal representative of a televised scene and occurring during a succession of trace intervals separated by retrace intervals; developing a synchronizing signal including a component conveying timing information and occurring in each of said trace intervals; combining said video and synchronizing signals to develop a television signal for transmission to subscriber receivers; effectively introducing into said television signal at least during said trace intervals thereof a coding-signal component of such frequency and phase as to effect at least partial cancellation of said synchronizing signal; and effectively interrupting at least one of said components from time to time.

26. The method of subscription television which comprises the steps of: developing a video signal including components representative of a televised scene and occurring during a succession of trace intervals separated by retrace intervals; exalting the amplitude of the video components contained within the central portion of certain of said trace intervals relative to that of the video components in the terminal portions of such certain intervals to develop a modified video signal; developing a synchronizing signal including components conveying timing information and occurring in said retrace intervals; effectively suppressing said synchronizing component during at least some of the retrace intervals to develop a modified synchronizing signal; and transmitting said modified video and modified synchronizing signal to subscriber receivers.

27. In a subscription television system, a method for utilizing a scrambled signal including a carrier wave modulated within a fixed amplitude range with video during line-trace intervals, within said range with true-synchronizing components during line-retrace intervals, beyond said range with false-synchronizing components occurring intermittently in said retrace intervals and further modulated by a coding-signal component occurring at line frequency in phase opposition to said synchronizing components and serving as a pedestal to exalt said video in the central portion of said trace intervals, which method comprises the steps of: selecting said scrambled signal; modulating said scrambled signal with a decoding-signal component corresponding in frequency but opposite in phase to said coding-signal component to effect cancellation of said coding component from said scrambled signal; modulating said scrambled signal with a pedestal component occurring during said retrace intervals to raise said true-synchronizing components to an amplitude level exceeding said range; further modulating said scrambled signal with a counter-phase-synchronizing component occurring during retrace intervals to suppress said false components from any of said intervals in which said false components appear, thereby to derive an unscrambled signal with said true-synchronizing components predominating during line-retrace intervals; and utilizing said unscrambled signal to reproduce a televised image.

28. A method of subscription television reception which comprises the steps of: deriving a video signal including components occuring during a succession of trace intervals separated by retrace intervals and having the amplitude of the video components contained within the central portion of certain of said trace intervals exalted relative to that of the video components in the terminal portions of such certain intervals; effectively depressing the amplitude of said exalted video components to restore a normal amplitude relation of video components throughout each of said trace intervals and develop a modified video signal; deriving a synchronizing signal including components occurring in only certain of said retrace intervals; modifying said synchronizing signal to include components occurring in substantially all of such retrace intervals; and utilizing said modified video and modified synchronizing signal to reproduce an image.

29. A subscription television receiving system for utilizing a carrier-frequency television signal modulated during line-trace intervals with video information and during line-retrace intervals with synchronizing information, at least one of said modulations being coded, said system comprising: a decoder mechanism including a radio-frequency tuner for selecting said carrier-frequency signal, means for deriving a decoding signal for decoding said carrier-frequency signal, means for utilizing said carrier-frequency signal and said decoding signal to develop a decoded carrier-frequency signal and means for heterodyning said decoded carrier-frequency signal to a predetermined television channel assignment different from that of said received signal; a television receiver including a radio-frequency tuner tunable to said predetermined television channel, an image reproducer and a scanning system responsive to synchronizing information of a received television signal for timing the operation of said reproducer; means for supplying said heterodyned, decoded carrier-frequency television signal from said decoder to said tuner of said receiver; and means for deriving a timing signal from said scanning system of said receiver and for applying said timing signal to said decoder mechanism to synchronize the operation of said decoder mechanism to characteristic timing functions determined by said synchronizing information of said received television signal.

References Cited in the file of this patent

UNITED STATES PATENTS

| | | |
|---|---|---|
| 2,656,410 | Herrick | Oct. 20, 1953 |
| 2,673,238 | Druz | Mar. 23, 1954 |
| 2,691,061 | Crotty | Oct. 5, 1954 |
| 2,705,740 | Druz | Apr. 5, 1955 |
| 2,846,497 | Kennedy | Aug. 5, 1958 |
| 2,907,816 | Weiss | Oct. 6, 1959 |